United States Patent [19]
Ito et al.

[11] Patent Number: 5,204,986
[45] Date of Patent: Apr. 20, 1993

[54] BATTERY POWERED RADIO DEVICES HAVING A BATTERY SAVING FUNCTION

[75] Inventors: Koichi Ito; Yasuo Oonishi, both of Tokyo, Japan

[73] Assignee: Kabushiki Kaisha Toahiba, Japan

[21] Appl. No.: 825,283

[22] Filed: Jan. 27, 1992

Related U.S. Application Data

[63] Continuation of Ser. No. 626,329, Dec. 13, 1990, which is a continuation of Ser. No. 314,122, Feb. 23, 1989.

[30] Foreign Application Priority Data

Feb. 25, 1988 [JP] Japan .................................. 63-43189

[51] Int. Cl.⁵ ................................................ H04B 1/16
[52] U.S. Cl. .................................... 455/343; 455/231; 340/825.17
[58] Field of Search ................. 455/69, 89, 127, 154, 455/230-231, 343; 340/825.17, 825.44, 825.47, 825.48; 379/58-59, 61; 320/21, 48

[56] References Cited

U.S. PATENT DOCUMENTS

| | | | |
|---|---|---|---|
| 3,877,001 | 4/1975 | Bogut et al. | 455/127 |
| 4,353,065 | 10/1982 | Mori | 455/343 |
| 4,449,248 | 5/1984 | Leslie et al. | 455/231 |
| 4,663,623 | 5/1987 | Lax et al. | 455/343 |
| 4,716,463 | 12/1987 | Stacy et al. | 455/343 |
| 4,736,461 | 4/1988 | Kawasake et al. | 455/343 |
| 4,851,820 | 7/1989 | Fernandez | 340/825.44 |
| 4,860,005 | 8/1989 | DeLuca et al. | 455/343 |

FOREIGN PATENT DOCUMENTS 62-72234 4/1987 Japan .................................. 455/127

*Primary Examiner*—Edward L. Coles, Sr.
*Assistant Examiner*—Kinfe-Michael Negash
*Attorney, Agent, or Firm*—Banner, Birch, McKie & Beckett

[57] ABSTRACT

A radio apparatus having a battery saving function comprising an indicator for indicating that power is being supplied. An indicator is actuated in synchronization with the battery saving operation. In particular, a receiving circuit is intermittently triggered by the power supply and the indicator is intermittently triggered in synchronization with at least some of the power supply signals that trigger the receiving circuit. The period of actuation for the indicator may be less than the receiving circuit, which is intermittently actuated in accordance with a battery saving operation. Also, the indicator means may be actuated once for each n times that the receiving means is actuated.

16 Claims, 8 Drawing Sheets

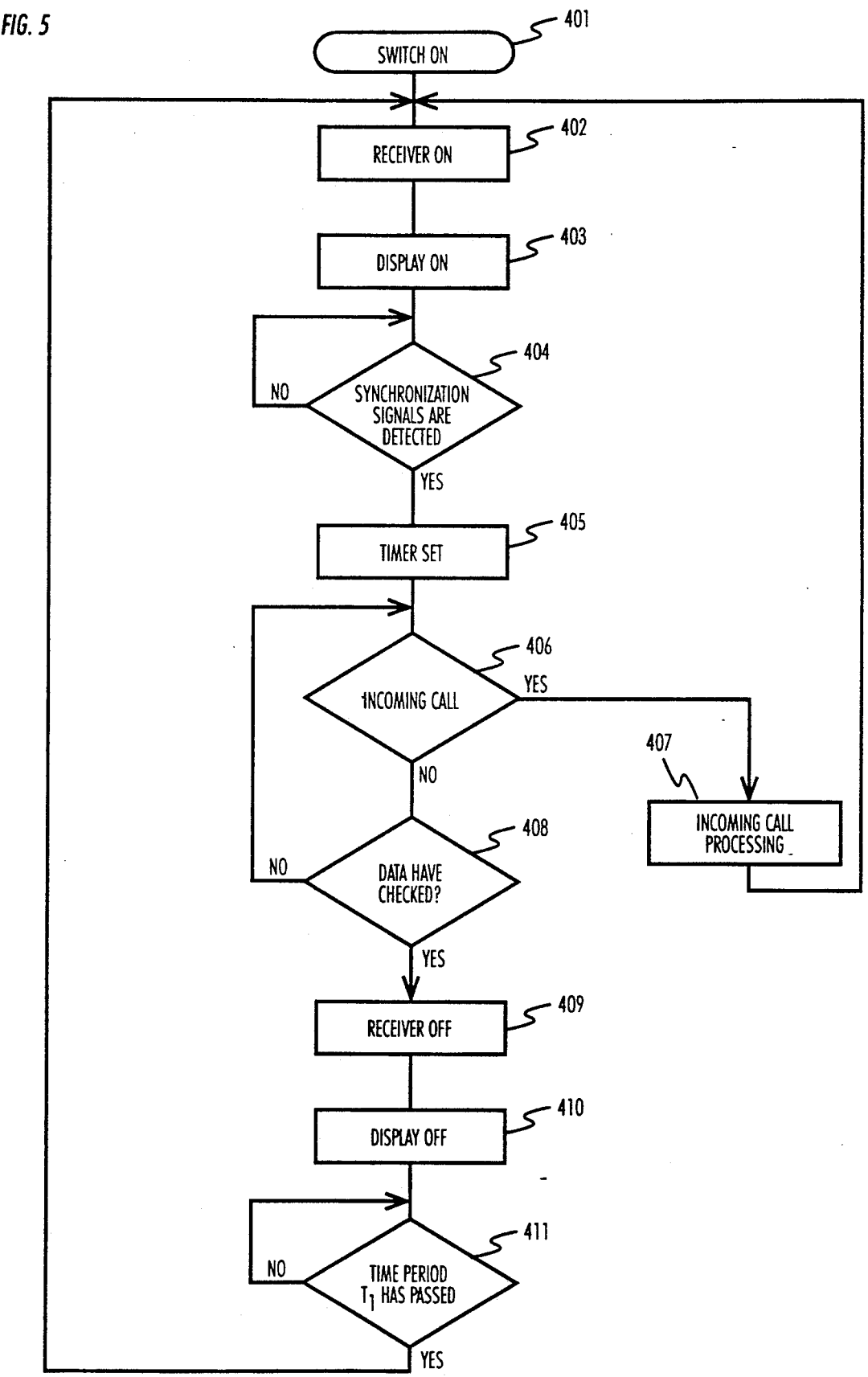

BATTERY POWERED RADIO DEVICES HAVING A BATTERY SAVING FUNCTION

This application is a continuation of application Ser No. 07/626,329, filed Dec. 13, 1990 which is a continuation, of application Ser. No. 07/314,122, filed Feb. 23, 1989.

FIELD OF THE INVENTION

This invention relates to the field of battery powered devices such as pagers, cordless telephones, or the like and, more specifically, to battery powered radio devices in which power supply to a radio section thereof is intermittently actuated for saving battery consumption.

DESCRIPTION OF THE RELEVANT ART

Generally, it is required to reduce consumption of electric power in a battery powered radio device since a battery has a limited power capacity.

In prior art battery powered radio devices such as pagers, cordless telephones, and the like a conventional battery saving technique has been adopted to save battery consumption. According to this technique, the power supply of the receiving section of the radio device is periodically turned on and off in synchronization with the received data signals.

BACKGROUND OF THE INVENTION

The block diagram of FIG. 1 shows one example of a prior art cordless telephone. A battery 1, which is chargeable through a charging terminal 2, supplies power to a power source circuit 3 by closing a power switch 4. Power source circuit 3, under control of a control circuit 5, converts the voltage from battery 1 to an appropriate voltage, and supplies this voltage to control circuit 5, to a transmitter 6 and to a receiver 7.

In a waiting state, i.e., awaiting an incoming call, the converted voltage from power source circuit 3, controlled by circuit 5, is intermittently applied to receiver 7. Upon receipt of a group signal, the receiver is synchronized with the transmitted signal from a base station for receipt of further intermittent signals. Consequently, receiver 7 carries out reception operation intermittently as shown in FIG. 2, thereby saving power consumption of the cordless telephone.

A significant problem in these prior art systems is the inability of the user of the battery powered radio to detect whether the system is operating properly. In particular, it has become necessary for the user to determine whether the communication link from the base station to the radio receiver is operating properly. Any defect in the base transmitter, or in the radio receiver, or due to interference could prevent the reception and processing of the data at the receiver. Not only is it important to identify the existence of a problem but to indicate it to the user in a manner which will avoid a large consumption of power.

The synchronized operation of several battery powered radio devices incorporating the prior art battery saving function is shown in FIGS. 3(a)-(c).

Referring to FIG. 3(b), all devices in a system are divided into M groups, for example, 3 groups. A base unit repeatedly broadcasts a frame signal consisting of M group signals. Each group signal includes preamble words and N calling words (FIG. 3(a)). The preamble word includes a predetermined synchronization signal for synchronization of received signals and a group identification signal for showing that the following paging words are addressed to pagers belonging to the group designated by the group identification signal. In response to a calling request, an identification signal of the device to be called is assigned to one of calling words 1 to N.

Referring to FIG. 3(c), if a device is turned on, the device examines the received signals to detect the synchronization signal. Once detecting the synchronization signal, the device performs intermittent reception so that only a group signal to the device is received.

In fact, prior art radio devices such as the cordless devices mentioned above have not even provided any indication whether the power source switch was closed. Apparently, if such an indicator was used to display the activation of the source, the display would emit light continuously thereby increasing power consumption and shortening the active life of the radio devices. It would be possible to increase the capacity of the battery, but this would necessarily result in high cost, increased weight and longer charging times.

SUMMARY OF THE INVENTION

It is accordingly an object of the present invention to provide an indication to the user of the battery powered radio whether the communication link is adversely effected.

It is a further object of the present invention to indicate a fault condition while saving battery consumption.

It is a still further object of the present invention to provide an improved radio device for indicating that the power source is activated while saving power consumption.

In achieving these objects, as embodied and described herein, the invention incorporates an indicator for indicating both the activation of the power source and the intermittent reception and processing of transmitted signals.

In achieving these objects the invention comprises receiving means for receiving signals broadcast over one or more radio channels; power supply means for supplying said receiving means with power; and an indicator circuit coupled to said power supply means; power supply control means coupled to said power supply and indicator circuit, for controlling said power supply means so that said receiving means is intermittently triggered by power supply signals and said indicator circuit is triggered in synchronization with at least some of the power supply signals that trigger the receiving means.

The prior art problems, discussed above, are solved by the principle of the present invention. In this invention, an indicator is triggered in synchronization with at least some of the signals that trigger the receiving means. Consequently, a user is informed of the operational state of the radio apparatus by observing the intermittent indication while minimizing power consumption. In some embodiments, as described below, the indicator also provides an indication of the state of the power supply (i.e., whether activated).

BRIEF DESCRIPTION OF THE DRAWINGS

FIG. 5 is a flow chart showing one embodiment that can be incorporated in the cordless telephone shown in FIG. 4;

DETAILED DESCRIPTION

A preferred embodiment of the present invention applied in a cordless telephone will be described with reference to the accompanying drawings. The present invention may likewise be employed in other kinds of radio apparatus (e.g., pagers, etc.).

Figure 1:
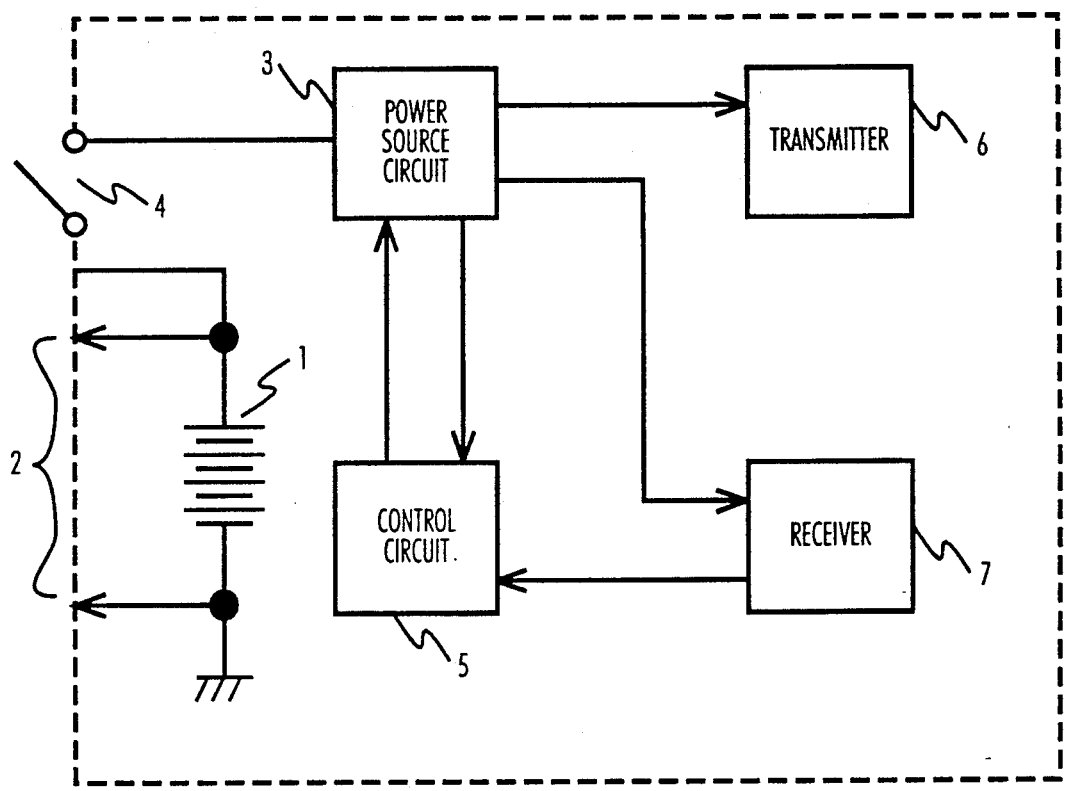
FIG. 1 is a block diagram of a conventional cordless telephone.
Figure 2:
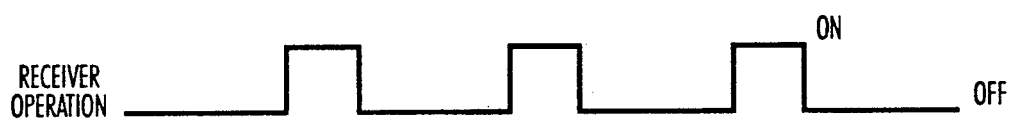
FIG. 2 is a diagram for explaining the battery saving techniques used in conventional cordless telephones.
Figure 3:
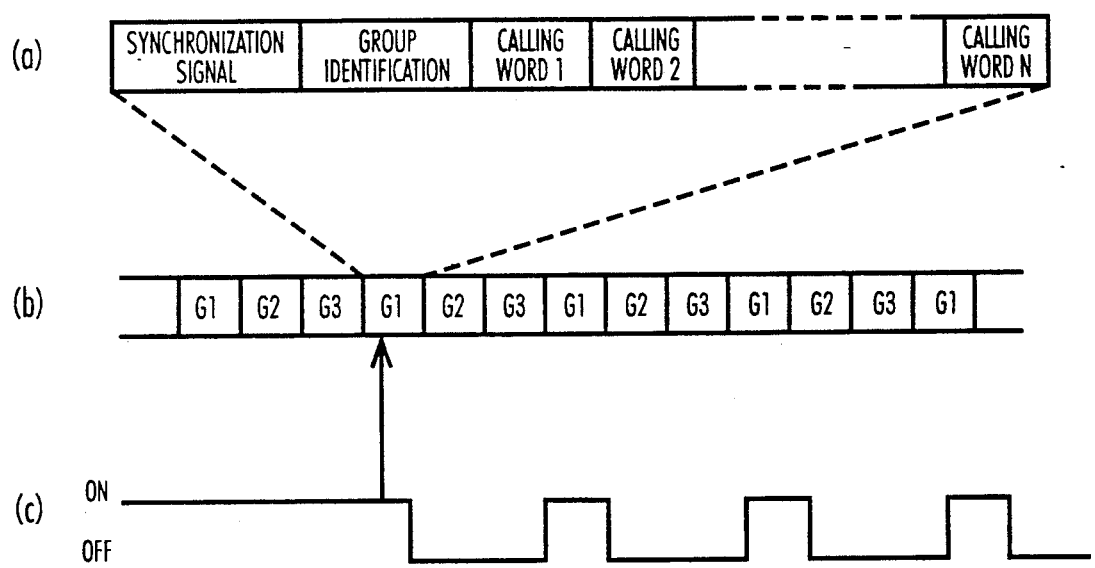
FIGS. 3 (a)-(c) are a diagram for explaining the synchronized operation of conventional battery powered radio devices.
Figure 4:
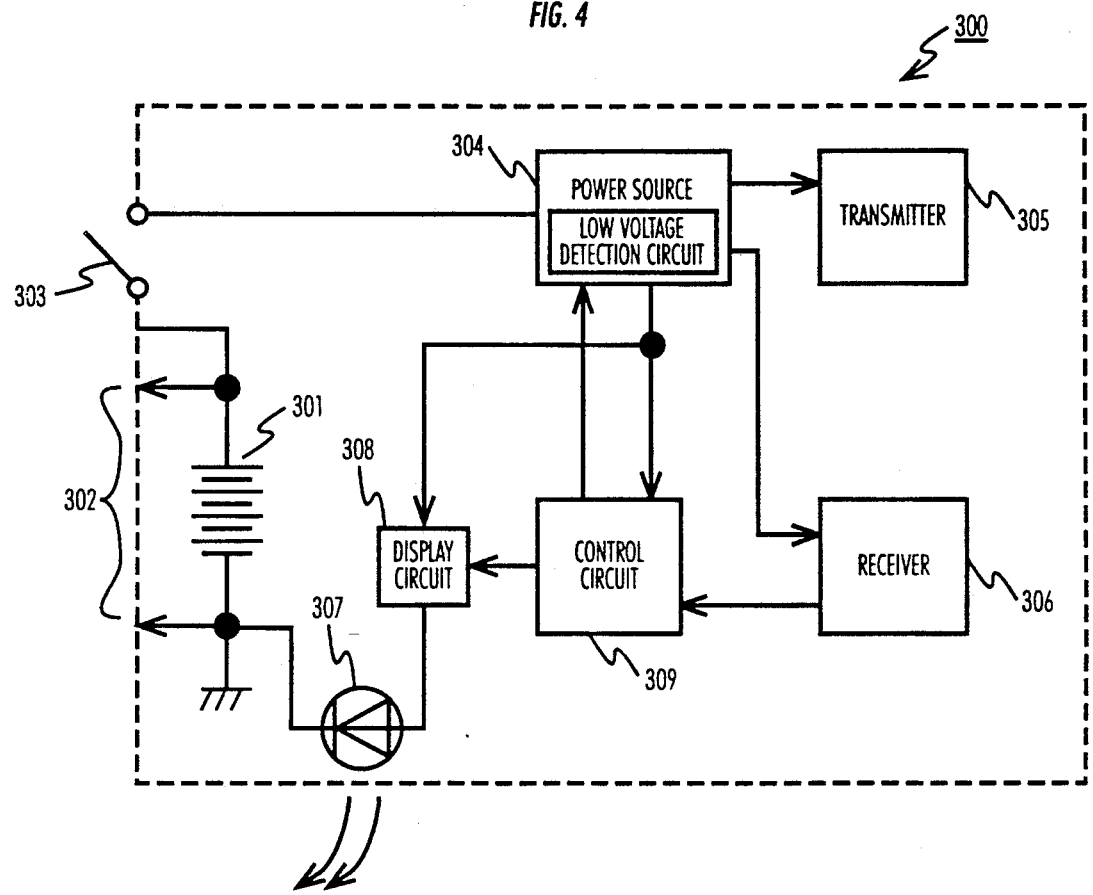
FIG. 4 is a block diagram of a cordless telephone embodying the present invention incorporating computer control.

FIG. 4 is a schematic block diagram showing an arrangement of a cordless telephone according to an embodiment of the present invention.

Referring to FIG. 4, cordless telephone 300 comprises: a rechargeable battery 301, a charging terminal 302, an on/off switch 303, a power source 304 for supplying power from battery 301 to each component of cordless telephone 300, a transmitter 305 receiving power from power source 304 for transmitting signals over a radio connection link, a receiver 306 receiving power from power source 304 for receiving signals transmitted over radio communication link, a light emitting diode (LED) 307 for emitting light, a display circuit 308 for applying drive current to LED 307, and a control circuit 309 including a microprocessor for controlling the overall operation of cordless telephone 300. Power source 304 comprises a low voltage detection circuit 310 for detecting when the voltage supplied from battery 301 drops below a preset threshold value.

FIG. 5 is a flow chart showing the operation of cordless telephone 300. Referring to FIG. 5, when on/off switch 303 is turned on by a user (step 401), control circuit 307 is powered by power source 304, which receives power from battery 301. Control circuit 309 controls power source 304 so that power is supplied to receiver 306.(step 402) and power is supplied to display circuit 308. As a result, drive current is applied to LED 307 from display circuit 308 (step 403).

Next, responsive to the detection of a synchronization signal followed by a group identification signal received by receiver 306 (step 404), control circuit 309 sets the internal timer thereof to zero for counting the time period for intermittent reception of the respective synchronized group signals (step 405). Control circuit 309 also checks whether the subsequently received signals include an incoming call to the cordless telephone by comparing a code accompanying the subsequent signals with a predetermined identification code for the cordless telephone, which is stored in control circuit 304 (step 406).

In the event that an incoming call is detected in step 406, the operation proceeds to the incoming call processing step (step 407). In the incoming call processing step, intermittent reception is temporarily stopped. Thereafter, the operation returns to step 401. If all the subsequent signals have been analyzed without the detection of an incoming call (step 408), control circuit 309 controls power source 304 so that the power supplied to receiver 306 is turned off (step 409) and drive current, via display current 308, is not applied to LED 307 (step 410). After the expiration of time period $T_1$ (step 411), the operation returns to step 402.

After on/off switch 303 is turned on, control circuit 309 intermittently applies converted voltage from power source 304 to receiver 306. Receiver 306 thereby performs an intermittent receiving operation as shown in FIG. 6(a) in synchronization with its respectively received group signals. Also, control circuit 309 intermittently triggers display circuit 308 synchronously with this intermittent receiving operation. Each time display circuit 308 is intermittently triggered, display circuit 308 produces a drive current from the voltage supplied from power source 304 for activating LED 307. Consequently, LED 307 emits light intermittently as shown FIG. 6(b) synchronously and coincidently with the intermittent receiving operation of receiver 306. Thus, as LED 307 emits light intermittently, responsive to the intermittent receiving operation of receiver 306, the intermittent light emission of LED 306 shows that the cordless telephone performs intermittent operation by receiving signals from a base unit.

As long as the LED emits light intermittently, the system is operating properly. However, as soon as base unit fails to broadcast signals due to some defect or the signals from the base unit fail to reach the cordless telephone or receiver 306 breaks down, LED 307 will vary its operation and emit light continuously. This occurs since the operation stops at step 404 and does not proceed to step 405. Accordingly, a user of the cordless telephone may confirm whether the cordless telephone is operating properly by observing whether LED 307 emits light continuously or intermittently.

Also, the light emission of LED 307 indicates that power is fully supplied to operate the cordless telephone and the power source is in circuit. It should be noted that since LED 307 is intermittently activated, the power consumption required for the display is greatly reduced compared with what would be required if the LED was lit continuously.

When power is consumed by operation of the cordless telephone, resulting in the discharge of battery 301 and its resulting voltage drop, low voltage detection circuit 310 detects the voltage drop when it falls below a preset threshold value. When the preset voltage drop occurs, the operation of power source 304 is suspended. Display circuit then ceases to supply current to light emitting diode 307 and to prevent its further activation. Therefore, the user of the cordless telephone will become aware that battery 301 has been cut off.

Figure 7:
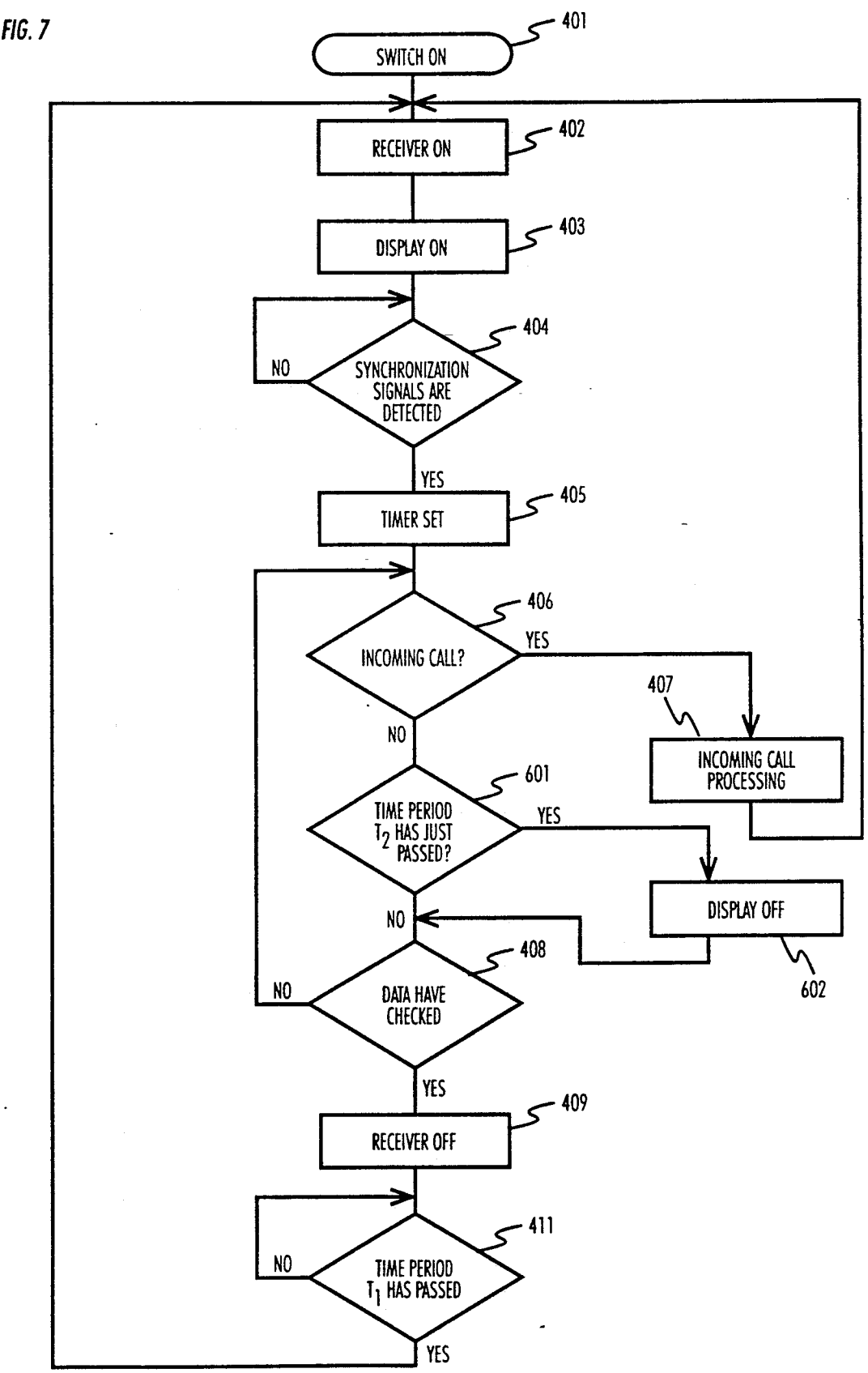
FIG. 7 is a flow chart showing another embodiment that can be incorporated in the cordless telephone shown in FIG. 4.

FIG. 7 is a flow chart showing another embodiment that can be incorporated in the cordless telephone shown in FIG. 4. In FIG. 7, the same reference numbers are given to steps which perform the same function as the corresponding steps shown in the flow chart of FIG. 5. Referring to FIG. 7, immediately after power is supplied to receiver 306 (step 402), LED 307 is lit (step 403). However, LED 307 will turn off after time period $T_2$ has elapsed (step 602) even though receiver 306 hasn't yet turned off (step 409).

Figure 8:
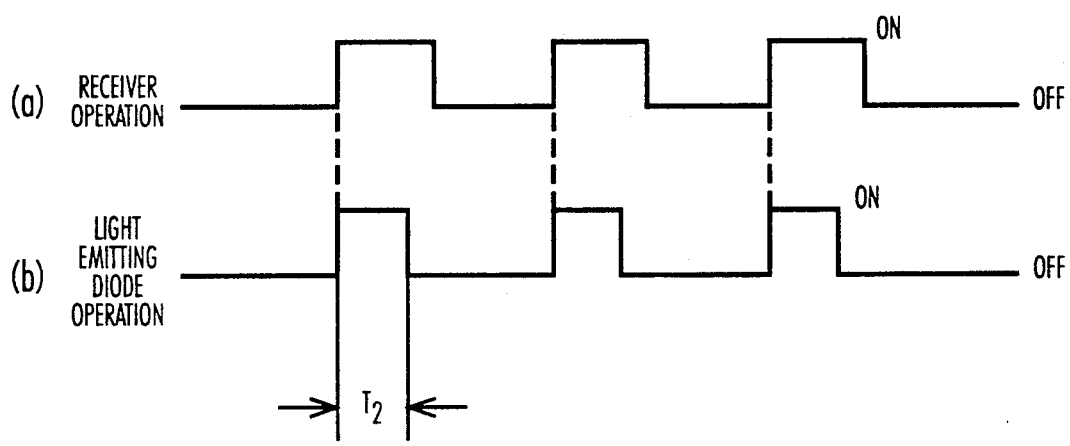
FIGS. 8 (a) and (b) are timing diagrams for explaining the operation of the invention in accordance with the embodiment of FIG. 7.

FIGS. 8(a) and (b) show the on/off state of receiver 306 and LED 307 according to the operational flow chart of FIG. 7. Referring to FIG. 8, control circuit 309 triggers receiver 306 to perform intermittent reception as shown in FIG. 8(a) and actuates display circuit 308 for a time shorter than this reception period. Consequently, display circuit 309 supplies current to LED 307 for a period shorter than the reception operation period, as shown in FIG. 8(b).

Figure 6:
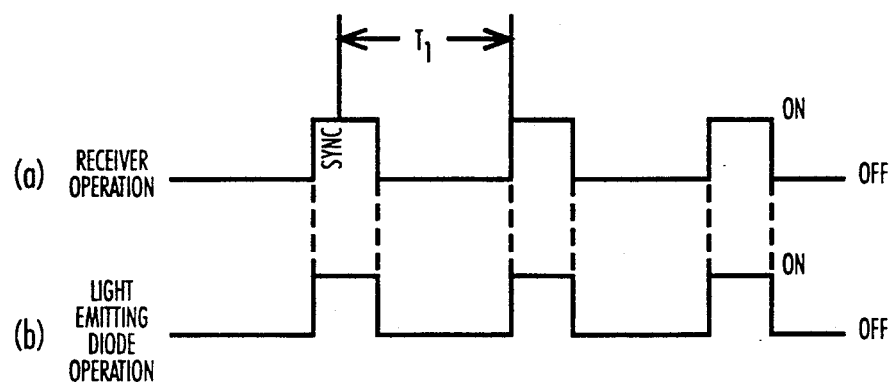
FIGS. 6 (a) and (b) are timing diagrams for explaining the operation of the invention in accordance with the embodiment of FIG. 5.

Accordingly, since current is supplied to LED 307 for a period shorter than the reception operation period, the required power consumption for light emission is even less than the operation shown in FIGS. 5 and 6, while still achieving all the benefits of the latter system.

Figure 9:
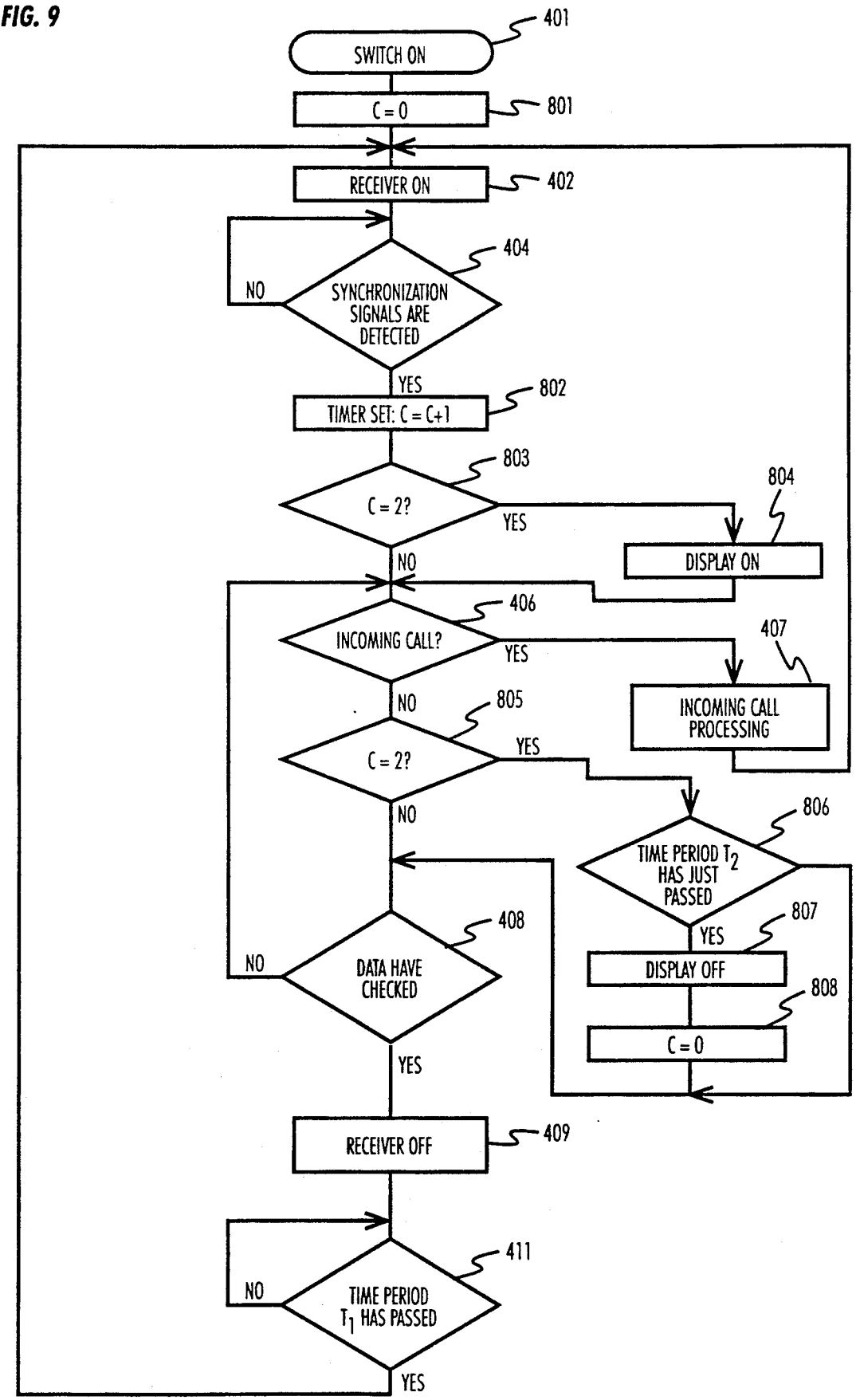
FIG. 9 is a flow chart showing yet another embodiment that can be incorporated in the cordless telephone shown in FIG. 4.

FIG. 9 is a flow chart showing yet another embodiment that can be incorporated in the cordless telephone shown in FIG. 4. In FIG. 9, the same reference numerals are given to steps which perform the same function as the corresponding steps shown in the flow chart of FIG. 4. Referring to FIG. 9, after on/off switch 303 is turned on (step 401), count value C is initially set to zero (step 801) in control circuit 309. After the processing of steps 402 and 404, as previously described with respect to FIG. 5, control circuit 309 sets the internal timer thereof to zero and increments its count value C by one (step 802). In step 803, control circuit 309 checks whether count value C is equal to two. If equal to two, control circuit 309 controls display circuit 308 so that drive current is applied to LED 307 (step 804). The incoming call (step 406), is then examined, as previously described with respect to FIG. 5. If all the subsequent signals have been analyzed without the detection of an incoming call, control circuit 309 again checks whether the count value C is equal to two (step 805). If the value is equal to two, control circuit 309 determines whether the time counted by the interval timer, previously set to zero in step 802, has exceeded time period $T_2$ (step 806). If the counted time exceeds time period $T_2$, control circuit 309 controls display circuit 308 to prevent drive current from being supplied to LED 307 (step 807) and to reset the count value C to zero (step 808). The operation then returns to the checking step of 408. If the counted time does not exceed $T_2$ (step 806), the operation returns to step 408 without proceeding to steps 807 and 808.

Figure 10:
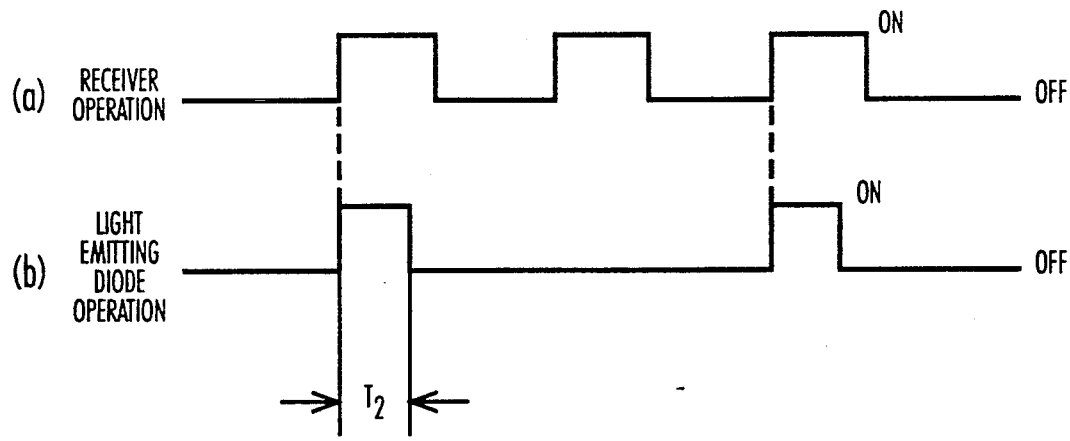
FIG. 10 (a) and (b) are timing diagrams for explaining the operation of the invention in accordance with the embodiment of FIG. 9.

FIGS. 10(a) and (b) show the on/off state of receiver 306 and LED 307 according to the operations shown in FIG. 9. Referring to FIG. 10, control circuit actuates receiver 306 as shown in FIG. 10(a) for intermittent reception, while activating display circuit 308 once for every two actuations of receiver 306. Also, the period of actuation for display circuit 308 is shorter than the reception period. Consequently, display circuit 308 supplies power to LED 307 only once for every two reception actuations, and for a period of time shorter than the reception actuation time. Consequently, light emitting diode 307 is intermittently lit once for every two reception actuations, as shown in FIG. 10(b), and for a period of time shorter than the reception time. As with all previous embodiments the indicator is triggered in synchronization with at least some of the signals that trigger the receiver. Thus, a user is informed of the operational state of the radio apparatus by observing the intermittent indication while still minimizing power consumption.

According to this operation, since current is fed to LED 307 once for each two times of reception actuation, the power consumption for light emission is even less than the operations discussed in reference to FIGS. 5-8. It should be noted that the period of actuation for display circuit 308 ($T_2$) is preferably selected so that a user will recognize the emission of light from LED 307. Also, while display circuit 308 is actuated once for every two reception actuations, in this embodiment it may be actuated once for every n times. The number n may be preferably selected so that a user will recognize the light emitted from diode 307 while concomitantly conserving battery consumption.

In this embodiment, display circuit 308 is not actuated until a synchronization signal is detected (step 404 and 804 of FIG. 9). Therefore, in the event that the cordless telephone does not perform properly (e.g., receiver fails, base unit fails to broadcast or transmitted signals fail to reach the receiver) LED 306 will not emit any light even after on/off switch 303 is closed. This will result in less power consumption than would occur with the previous embodiments.

Figure 11:
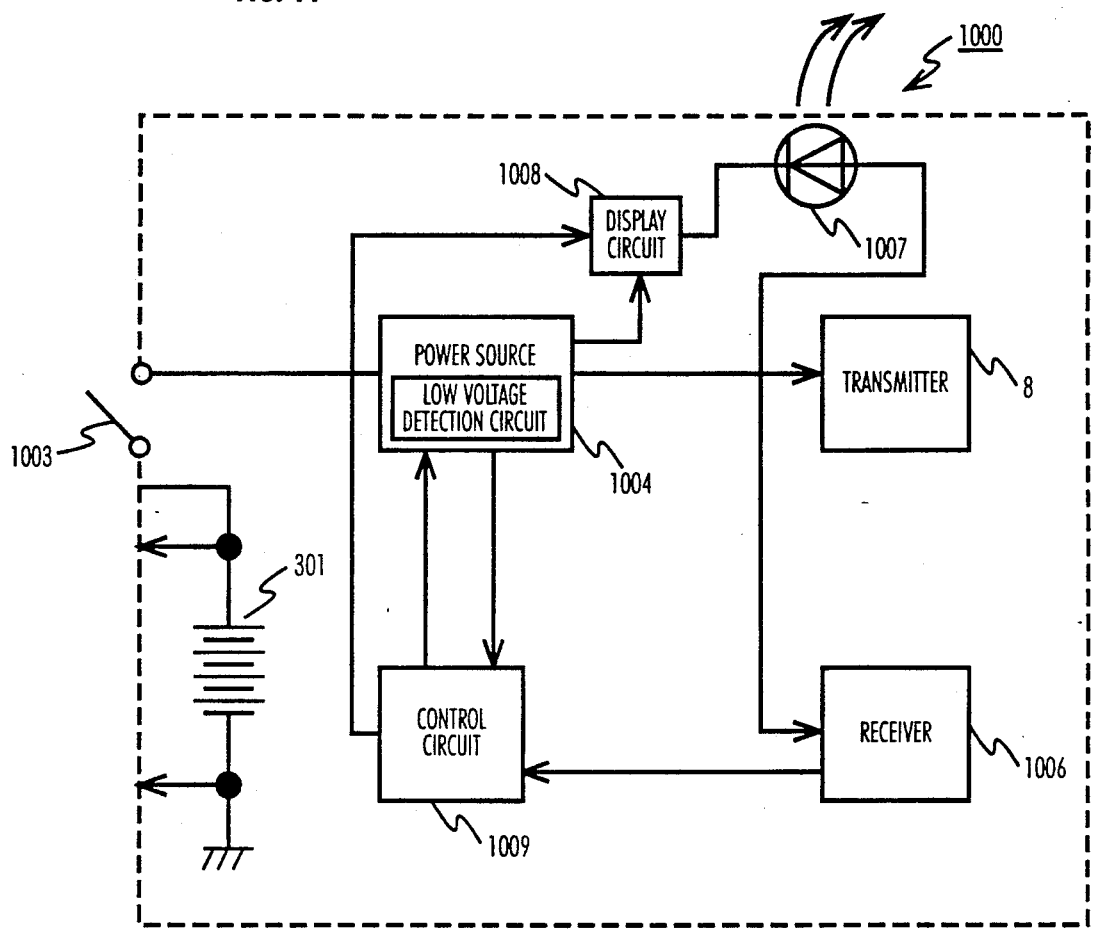
FIG. 11 is a further embodiment of a cordless telephone embodying the present invention incorporating hard wire control.

FIG. 11 is a schematic block diagram shown an arrangement of a cordless telephone 1000 according to another embodiment of the present invention.

Figure 12:
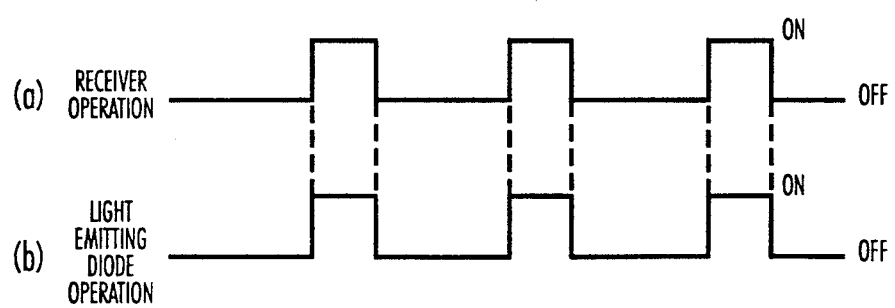
FIG. 12 (a) and (b) are timing diagrams for explaining the operation of the invention in accordance with FIG. 11.

In the embodiment shown in FIG. 11, display circuit 1008 and light emitting diode (LED) 1007 are inserted between power source circuit 1004 and receiver 1006. Thus, the current output from power source circuit 1004 is fed to receiver 1006 through display circuit 1008 and LED 1007, thereby causing receiver 1006 to receive signals broadcast over a radio channel. Consequently, LED 1007 is automatically lit during the reception period of receiver 1006. When on/off switch 1003 is closed, control circuit 1009 outputs current intermittently to receiver 1006 via display circuit 1008 and power source circuit 1004. Thus, the intermittent current from power source circuit 1004 is fed both to receiver 1006 and LED 1007. Consequently, receiver 1006 is made to receive intermittently as shown in FIG. 12(a) while the LED 1007 emits light synchronously with this intermittent receiving action, as shown in FIG. 12(b).

As with the previous embodiments, the LED is triggered in synchonously with at least some of the signals that trigger the receiver. In fact, like FIG. 5, the intermittent operation of the LED coincides with the operation of the receiver. Consequently, the user is informed of the operation state of the receiver while power is conserved. Also, in accordance with this embodiment, it is only necessary to change the prior art hardware circuit arrangement, rather than changing the software used in the microprocessor of control circuit 1009, as with the previous embodiments.

It should be noted that a lamp, a liquid crystal display device, or the like could be used in lieu of a light emitting diode, as shown in the above embodiments. In particular, a liquid crystal display could also efficiently save power consumption.

We claim:

1. A radio device comprising:

radio receiving means for receiving radio signals broadcast over one or more radio channels, said radio signals including at least one synchronizing signal;

power supply means for supplying said radio receiving means with electrical power;

indicator means coupled to said power supply means for indicating an operating state of the device;

low voltage detecting means for detecting a drop of voltage supplied from the power supply means, the operation of the power supply means being suspended when the low voltage detecting means detects the drop of voltage; and power supply control means, coupled to said power supply means, said radio receiver means, said low voltage detecting means and said indicator means, said power supply means responsive to said radio receiving means for detecting said at least one synchronization signal, and generating power supply signals in synchronization with said at least one synchronization signal and for controlling said power supply means so that said radio receiving means is intermittently powered by said power supply signals and said power supply control means terminates power to said indicator means when said low voltage detecting means detects a drop of voltage.

2. The device of claim 1 wherein said indicator means is triggered to turn on in synchronization with the on state of the power supply signals supplied to the receiving means.

3. The device of claim 1 wherein said indicator means is triggered to turn off in synchronization with the off state of the power supply signals supplied to the receiving means.

4. The device of claim 2 further comprising time measuring means for measuring a time period from when said indicator means is triggered to turn on and wherein the power supplied to said indicator means is turned off when the measured time period exceeds a predetermined time period.

5. The device of claim 4 wherein said predetermined period is shorter than the time period during which said receiving means is turned on.

6. The device of claim 1 wherein said indicator means is triggered to turn on once for every n times that the receiving means is turned on.

7. A radio device comprising:
radio receiving means for receiving radio signals broadcast over one or more radio channels, said radio signals including at least one synchronizing signal;

power supply means for supplying said radio receiving means with electrical power;

indicator means coupled to said power supply means for indicating an operating state of the device;

low voltage detecting means for detecting a drop of voltage supplied from the power supply means, the operation of the power supply means being suspended when the low voltage detecting means detects the drop of voltage; and power supply control means, coupled to said power supply means, said radio receiving means and said indicator means, responsive to said radio receiving means for detecting said at least one synchronization signal, wherein said power supply control means controls said power supply such that said radio receiving means is intermittently supplied power in synchronization with said at least one synchronization signal and said power supply control means terminates power to said indicator means when said low voltage detecting means detects a drop of voltage.

8. The device of claim 7 wherein said power supply control means controls said power supply means so that power supply of said indicator means is turned on when the power supply of the receiving means is turned on.

9. The device of claim 7 wherein said power supply control means controls said power supply means so that power supply of said indicator means is turned off when the power supply of the receiving means is turned off.

10. The device of claim 7 wherein said power supply control means controls said power supply means so that power supplied to said indicator means is turned off before the power supplied to the receiving means is turned off.

11. The device of claim 7 wherein said power supply control means controls said power supply means so that said indicator means is activated once for every n times that said receiving means is activated.

12. The device of claim 7 wherein said indicator means comprises a light emitting diode for emitting light in response to drive current from said power supply means.

13. A radio device comprising:
radio receiving means for receiving radio signals broadcast over one or more radio channels, said radio signals including at least one synchronizing signal;

indicator means coupled to said radio receiving means for indicating an operating state of the device;

power supply means for supplying said indicator means with electrical power;

low voltage detecting means for detecting a drop of voltage supplied from the power supply means, the operation of the power supply means being suspended when the low voltage detecting means detects the drop of voltage; and power supply control means coupled to said radio receiving means and said power supply means and responsive to said radio receiving means for detecting said at least one synchronization signal, for controlling said power supply means to intermittently supply power to said radio receiving means, said power supply control means terminates power to said indicator means when said low voltage detecting means detects a drop of voltage whereby said indicator means is periodically activated in synchronization with said at least one synchronization signal and said receiving means intermittently receives said radio signals.

14. The device of claim 13 wherein said indicator means comprises a light emitting diode driven by a drive current provided from said power supply means and said receiving means is activated by the drive current.

15. A radio device comprising:
radio receiving means for receiving radio signals broadcast over one or more radio channels, said radio signals including at least one synchronizing signal;

control means coupled to said radio receiving means for detecting a predetermined signal sequence including said at least one synchronization signal and generating a power supply signal in synchronization with said at least one synchronization signal;

power supply means responsive to the power supply signal for supplying power to said radio receiving means;

low voltage detecting means for detecting a drop of voltage supplied from the power supply means, the operation of the power supply means being suspended when the low voltage detecting means detects the drop of voltage; and display means coupled to said power supply means for displaying an operating state of the device, said power supply control means terminating power to said display means when said low voltage detecting means detects a drop of voltage.

16. A radio device comprising:

radio receiving means for receiving radio signals broadcast over one or more radio channels, said radio signals including at least one synchronizing signal;

control means coupled to said radio receiving means for detecting a predetermined signal sequence including said at least one synchronization signal and generating a power supply signal in synchronization with said at least one synchronization signal;

power supply means responsive to the power supply signal for supplying power to said radio receiving means;

low voltage detecting means for detecting a drop of voltage supplied from the power supply means, the operation of the power supply means being suspended when the low voltage detecting means detects the drop of voltage; and optical indicator means coupled to said power supply means for displaying an operating state of the device, said power supply control means terminating power to said optical indicator means when said low voltage detecting means detects a drop of voltage.

* * * * *